United States Patent [19]

Morgan, Jr.

[11] Patent Number: 5,148,938

[45] Date of Patent: Sep. 22, 1992

[54] PRESSURE VESSEL

[76] Inventor: Howard W. Morgan, Jr., 100 Anchor Rd., P.O. Box 735, Michigan City, Ind. 46360

[21] Appl. No.: 158,226

[22] Filed: Feb. 19, 1988

Related U.S. Application Data

[63] Continuation-in-part of Ser. No. 21,718, Mar. 4, 1987, abandoned.

[51] Int. Cl.$^5$ ............................................. B65D 45/00
[52] U.S. Cl. ........................... 220/316; 220/206; 220/254; 220/314; 220/323; 220/360; 220/361; 220/367
[58] Field of Search .................. 220/206, 208, 254, 314, 220/315, 316, 323, 360, 361, 367, 378; 114/201 R, 203, 320, 335; 49/316, 317, 318, 319, 320, 321

[56] References Cited

U.S. PATENT DOCUMENTS

| 622,546 | 4/1899 | Shaw | 220/323 X |
|---|---|---|---|
| 831,353 | 9/1906 | Johnston | 220/323 |
| 1,000,373 | 8/1911 | Burnett | 220/373 |
| 1,208,041 | 12/1916 | Steere | 220/316 |
| 1,514,507 | 11/1924 | Dreichlinger | 220/323 |
| 1,650,579 | 11/1927 | McBride | 220/323 |
| 2,308,320 | 1/1943 | Stephens | 220/316 |
| 2,875,918 | 3/1959 | Baumier | 220/323 |
| 3,084,828 | 4/1963 | Davies | 220/323 |
| 3,087,644 | 4/1963 | Hill et al. | 220/323 |
| 3,173,572 | 3/1965 | Beecher | 220/323 |
| 3,186,580 | 6/1965 | Previte | 220/206 |
| 3,434,621 | 3/1969 | Previte | 220/206 |
| 3,458,083 | 7/1969 | Erwin, Jr. | 220/316 |
| 3,667,649 | 6/1972 | Thillet | 220/323 |
| 3,694,145 | 9/1972 | Stevens | 220/323 X |
| 3,820,682 | 6/1974 | Davella | 220/315 |
| 3,876,385 | 4/1975 | Markus et al. | 220/316 |
| 4,093,104 | 6/1978 | Hutchinson | 220/316 |
| 4,273,064 | 6/1981 | Sutton | 114/203 |
| 4,307,818 | 12/1981 | Singh et al. | 220/316 |
| 4,467,936 | 8/1984 | Makhijani | 220/323 |
| 4,534,488 | 8/1985 | Boggs et al. | 220/323 |
| 4,614,281 | 9/1986 | Wright | 220/239 |

FOREIGN PATENT DOCUMENTS

| 1037897 | 8/1958 | Fed. Rep. of Germany | 220/323 |
|---|---|---|---|
| 1049830 | 2/1959 | Fed. Rep. of Germany | 220/323 |
| 151632 | 12/1931 | Switzerland | 220/323 |
| 176778 | 4/1935 | Switzerland | 220/323 |

Primary Examiner—Stephen Marcus
Assistant Examiner—Stephen Cronin
Attorney, Agent, or Firm—James D. Hall

[57] ABSTRACT

A pressure vessel arrangement including a lid with shiftable lock arms and a vent combination operating simultaneously. The lock arms passing through openings in the vessel housing sidewall when the lid is in the closed position. As the lock arms are shifted into a locked position a vent shaft into the vessel housing is sealed for pressurization of the vessel. Upon opening, the vent shaft is unsealed prior to disengagement of the lock arms to vent any residual pressure is the vessel safely.

8 Claims, 4 Drawing Sheets

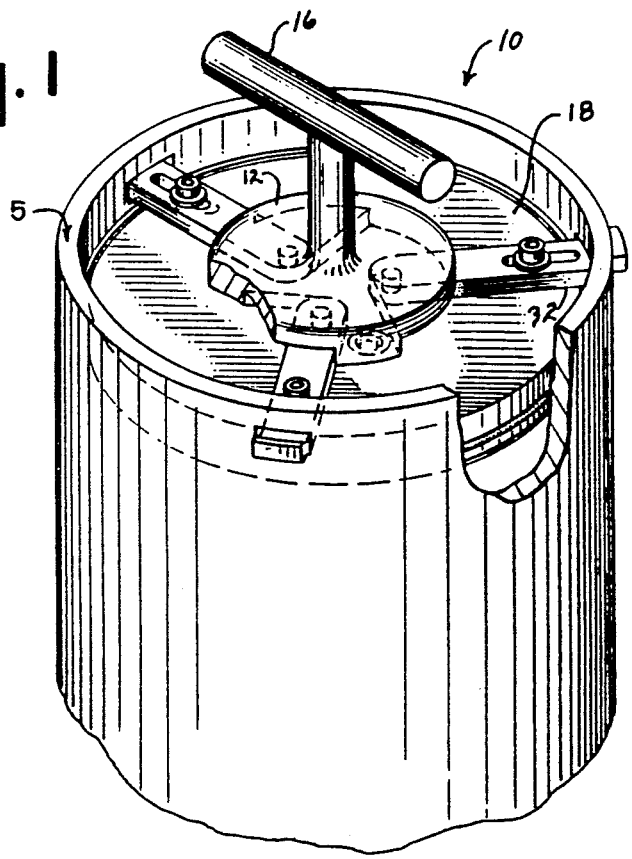
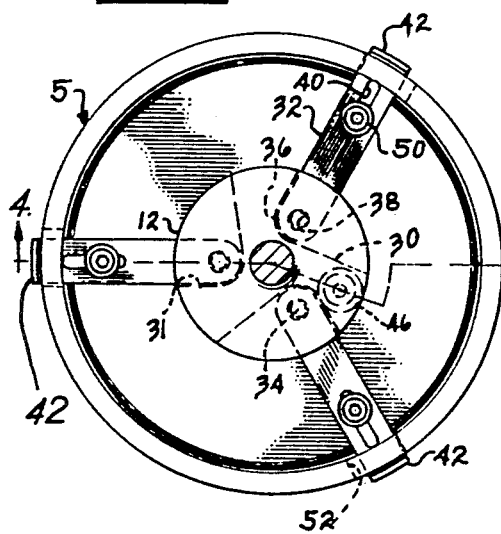
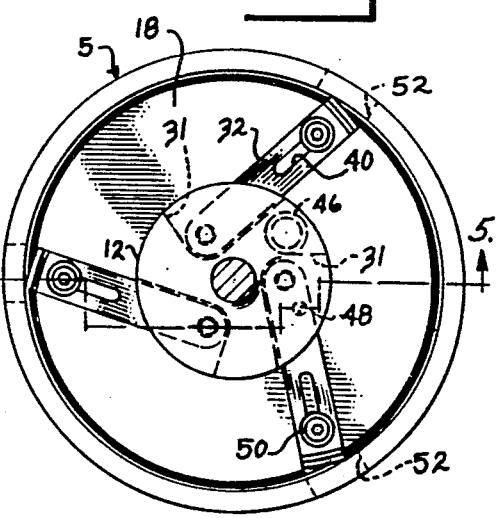

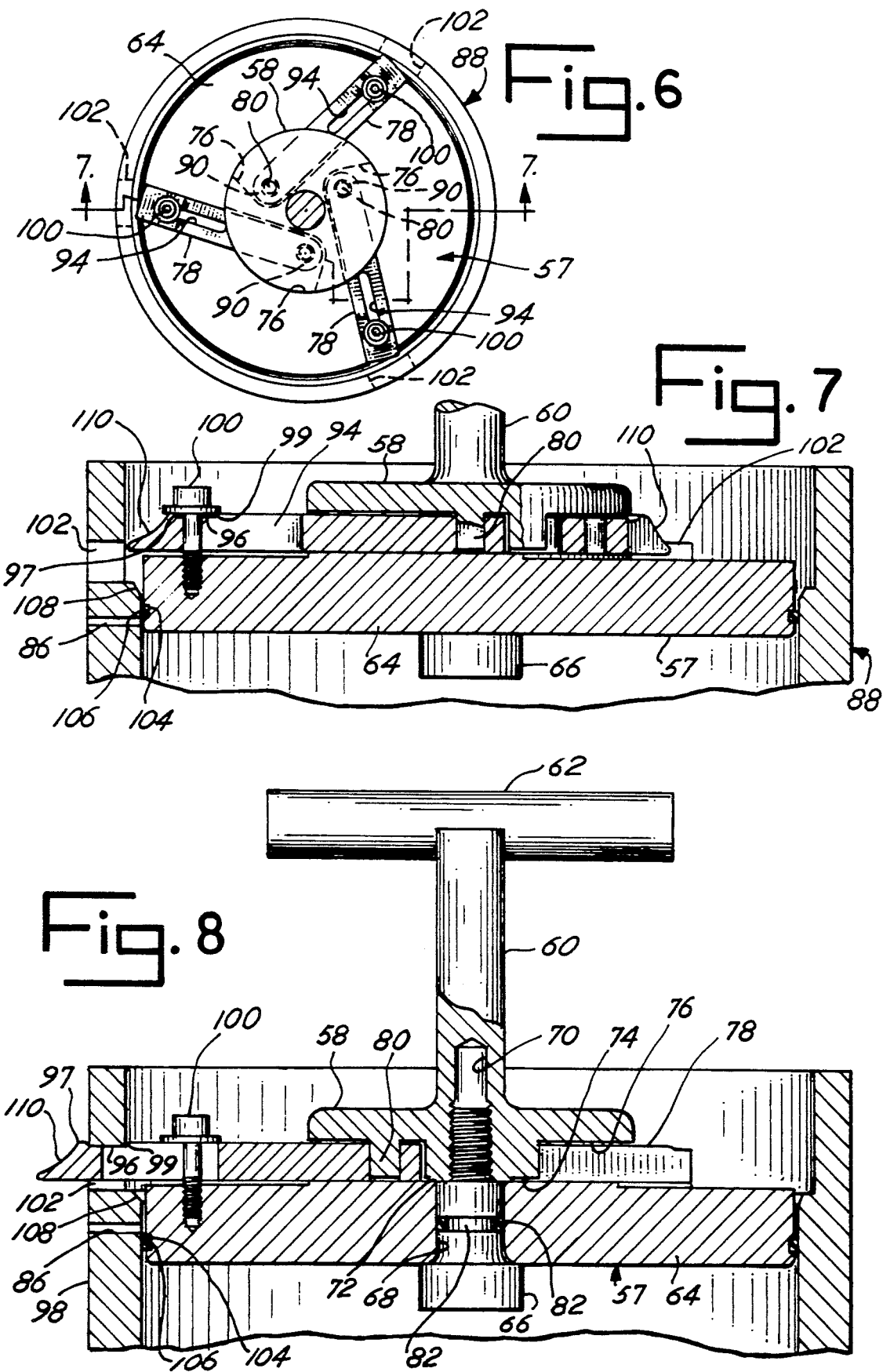

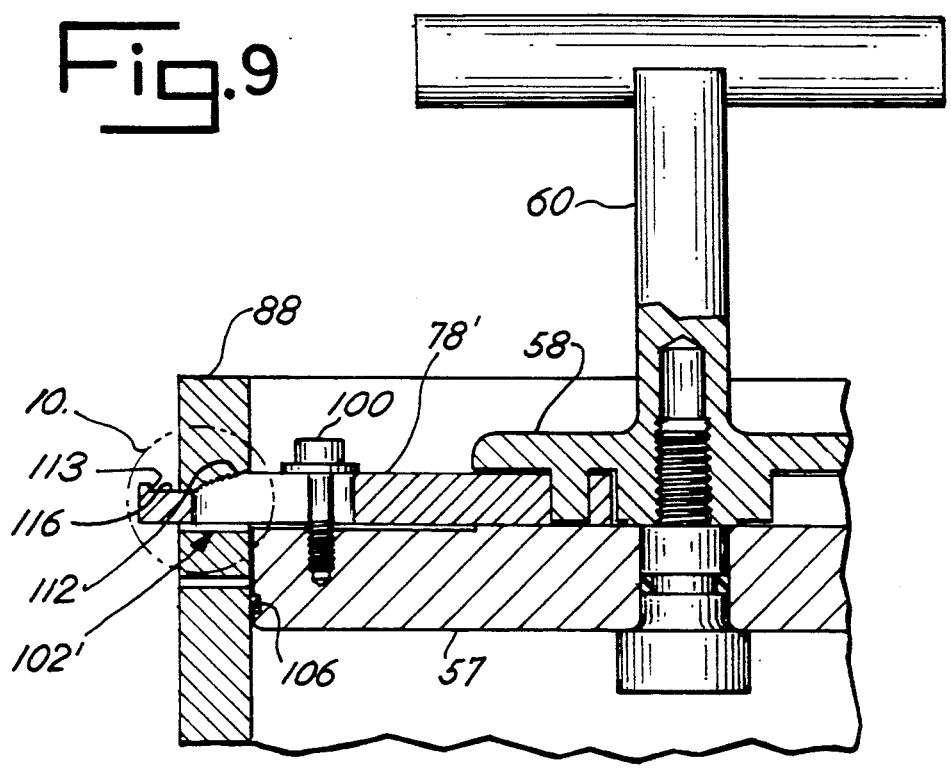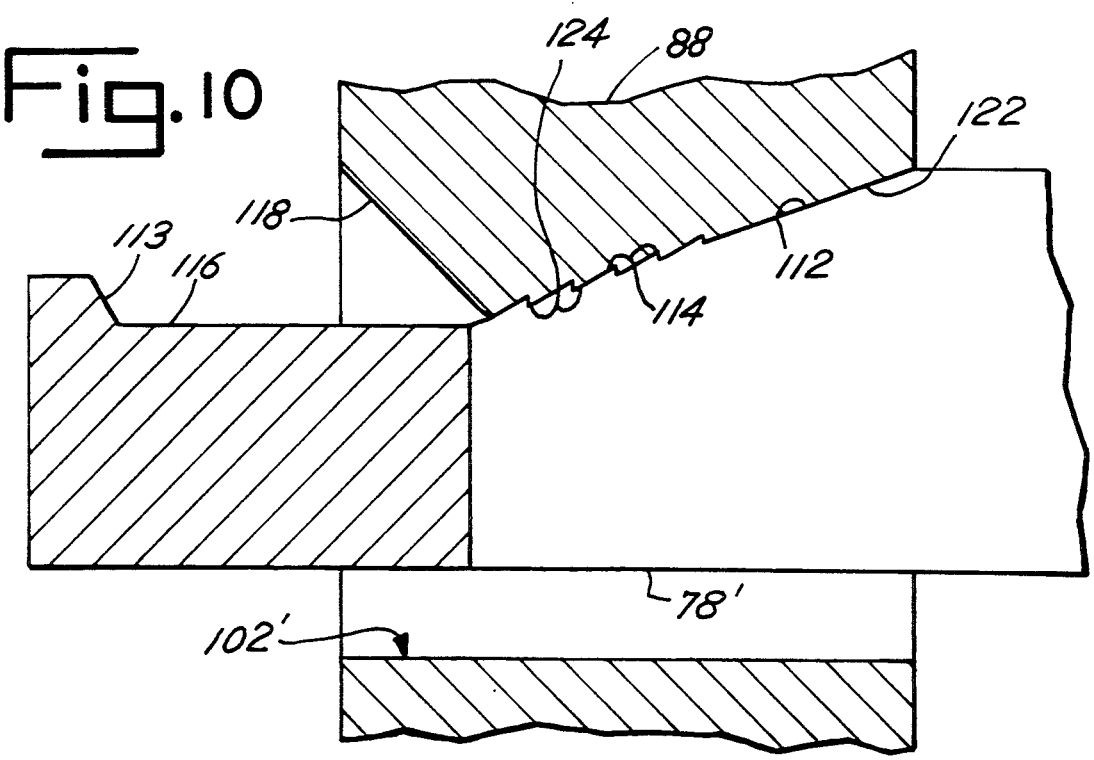

PRESSURE VESSEL

This is a continuation in part of application Ser. No. 07/02/718, filed Mar. 4, 1987, now abandoned.

BACKGROUND OF THE INVENTION

This invention relates to a vessel and will have special application to a pressure vessel having a lid which incorporates a safety device to prevent the premature sealing of the vessel as well as to prevent the opening of the vessel while under pressure.

Heretofore, pressure vessel lids have been constructed with safety features such as bleeder valves and pressure sensitive latches to prevent over pressurization of the vessel as well as to prevent the opening of the lid while the vessel is pressurized. However, a problem arises when due to user neglect either a bleeder valve is not properly adjusted or the latch is not properly closed during pressurization. Upon such conditions, a tragic accident could occur after pressurization if the latch or bleeder valve, which was improperly adjusted, opens rapidly. Such an event could cause an explosion of the vessel dispersing its liquid and injuring people nearby. This invention solves the problem above by combining the lid locking mechanism with a vent. In this invention, the housing is not sealed until the lid locking mechanism is fully closed, thereby preventing vessel pressurization until the lid is fully secured to the vessel housing. Detachment of the lid from the vessel housing is permitted only after the vessel is substantially depressurized and upon opening any residual pressure is completely and safely vented from the housing to the surroundings through the vent.

SUMMARY OF THE INVENTION

The pressure vessel of this invention eliminates the above dangers by providing a vent and lock combination which includes a lid with locking fingers. The pressure vessel includes a housing having parts which interlock with the locking finger of the lid to rescue the lid to the housing. The lid carries a seal positioned so that when the fingers are shifted into a locking position the vessel is sealed to allow pressurization. Therefore, the vessel can only be pressurized after the lid has been safely secured to the vessel. Upon the fingers being shifted from their locked position, the seal is allowed to move to unseal the vessel and allow residual pressure to vent before the vessel lid is completely unlocked.

Accordingly, it is an object of this invention to provide for a safer pressure vessel.

Another object of this invention is to provide for a pressure vessel that combines the lid latching mechanism with a vent means.

Other objects of this invention will become apparent upon a reading of the following description.

BRIEF DESCRIPTION OF THE DRAWINGS

FIG. 1 is a perspective view with portions cut away for illustration of the lid attached to a vessel housing and in the fully closed position.

FIG. 2 is a top view of the pressure vessel with the lid in a closed position.

FIG. 3 is a top view of the pressure vessel with the lid in an open position.

FIG. 6 is a top view of a second embodiment of the pressure vessel with the lid in the open position.

FIG. 7 is a fragmentary cross-sectional view of the vessel of FIG. 6 with the lid in the open position taken along line 7—7 of FIG. 6.

FIG. 8 is a fragmentary cross-sectional view of the vessel of FIG. 6 with the lid in the closed position.

FIG. 9 is a fragmentary cross-sectional view of a third embodiment of the pressure vessel with the lid in the closed position.

FIG. 10 is an enlarged view of the circled area designated by numeral 10 in FIG. 9

DESCRIPTION OF THE PREFERRED EMBODIMENTS

The preferred embodiments herein disclosed are not intended to be exhaustive or to limit the invention to the precise forms disclosed. They are chosen and described to explain the principles involved to enable others skilled in the art to utilize the invention.

Figure 4:
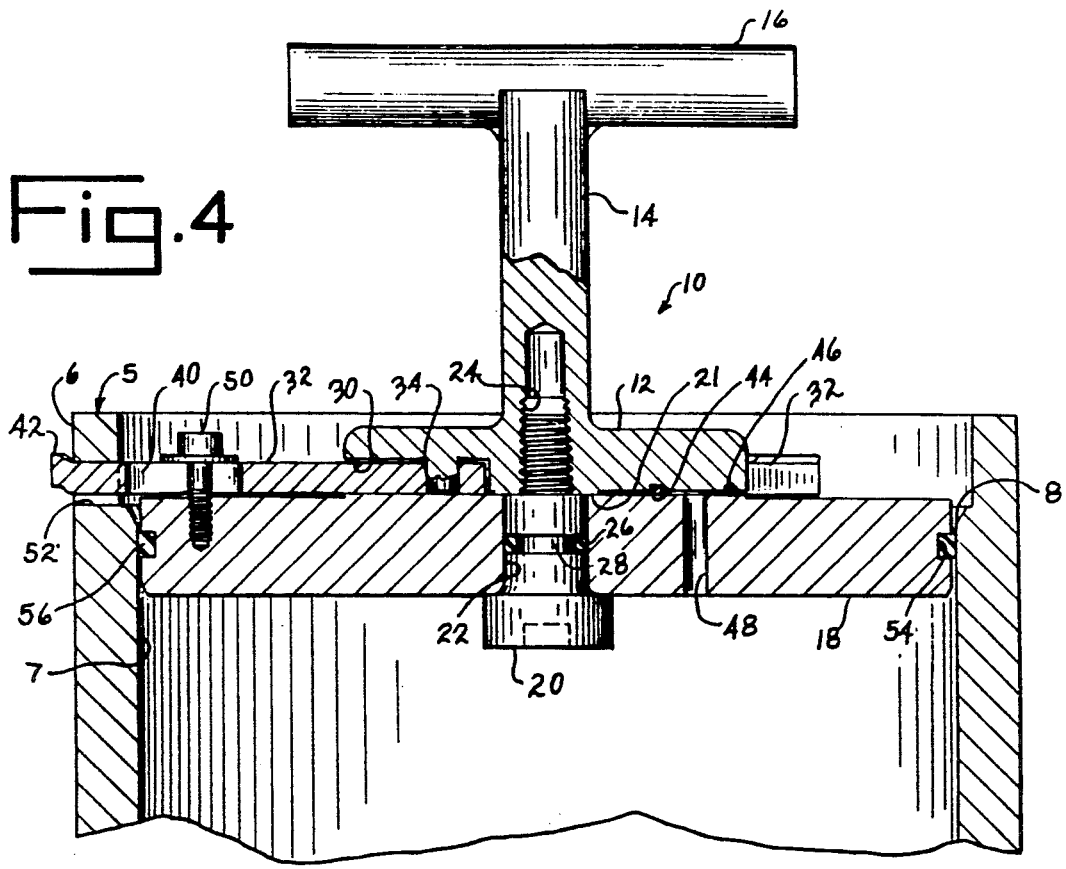
FIG. 4 is a sectional view of the pressure vessel, fragmented with the lid in a closed position taken along line 4—4 of FIG. 2.
Figure 5:
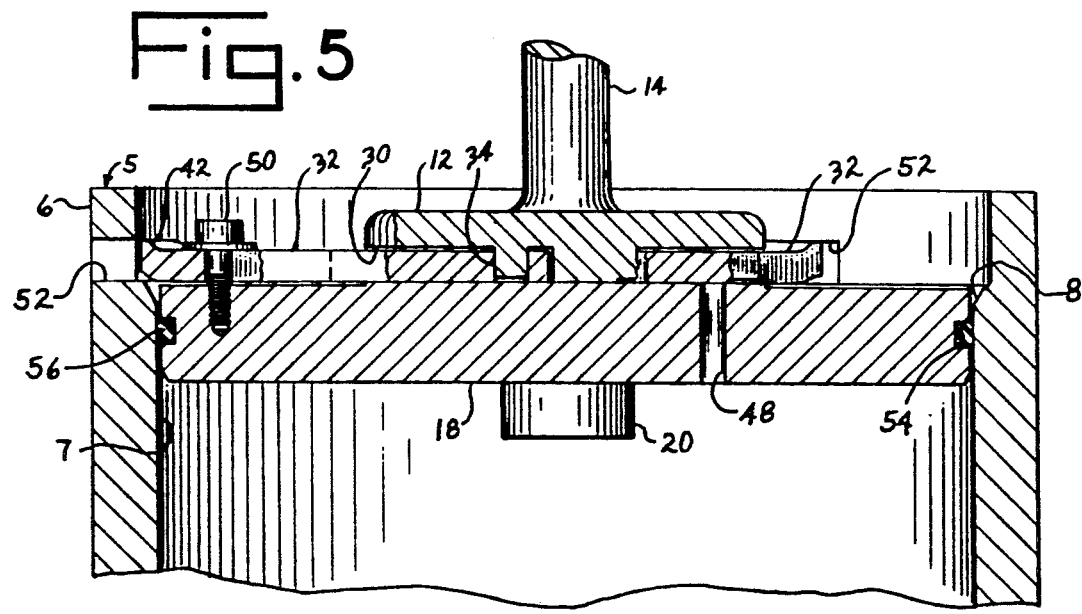
FIG. 5 is a sectional view of the pressure vessel fragmented with the lid in an open position taken along line 5—5 of FIG. 8.

The pressure vessel lid 10 shown in FIGS. 1-5 includes a flange 12 which in the preferred embodiment is a molded part of handle 14. Horizontal handle member 16 is connected to handle member 14 to form a grip for the user. Flange 12 is rotatably connected to cover plate 18 which forms a part of the lid by a threaded fastener 20 which traverses a central bore 22 in plate 18 and is turned into a threaded bore 24 of handle 14 (as shown in FIG. 4). An annular boss 21 protrudes from the bottom side 23 of flange 12 about plate bore 22 and bears against plate 18 so as to cause a very small gap between flange 14 and the plate. This space allows for easier turning of handle 16.

Channels 80 are cut into the bottom side of flange 12 to accommodate the shiftable movement of generally equal angularly located locking fingers 32. Pintle pins 34, shown in the figures as a molded or cast part of flange 12, but which may be fixed to the flange by any suitable means, are positioned so as to allow the fingers 82 to pivot about the pintle pins within channels 30. Fastener 20 has an O-ring 26 fitted within annular groove 28 to effect a seal between central bore 22 and the shank of the fastener. Annular groove 44 formed in the bottom side of flange 12 for accommodating O-ring 46 is positioned in such a way as to effect a seal over the vent shaft 48 in cover plate 18 as the flange is rotated about the pivot axis of fastener 20 to locate lid 10 in its fully closed position as shown in FIGS. 1, 2 and 4.

Locking fingers 82 are generally formed in a rectangular bar shaped construction but have a rounded pivoting end 36. A bore 38 is formed at the radial center of the rounded end 36 of each lock finger 8 for accepting pintle pin 34. An alignment pin slot 40 is cut in each lock finger 32 to accommodate shiftable movement of finger 82 between an extended position as shown in FIG. 2 and a retracted position as shown in FIG. 8. For each finger 32, a raised shoulder part 42 is formed at the end opposite rounded end 36 to contact the outer wall 6 of a vessel housing 5 (shown in fragmented form for illustrative purposes) and thereby to prevent the opening of lid 10 while the vessel is pressurized. Housing wall 6 is enclosed at its bottom and one or more flow ports (not shown) are provided into housing 5 to allow for pressuring flow into and out of the housing.

Alignment bolts 50 secured to plate is shiftably connect fingers 82 to the plate through slots 40 in such positions so as to place the fingers in alignment with openings 52 in the housing wall 6. Plate 18 includes annular groove 54 formed in the circumferential edge of the plate so as to accept O-ring 54 which effects a seal between housing wall 7 and plate 18. Previously described vent shaft 48 is formed in plate 18 so as to release pressure from within the vessel when lid 10 is not in its fully closed position.

Vessel housing 5 is stepped at its uppermost edge, such that the thickness of the wall in that area which contains openings 52 is somewhat less than the thickness of the housing below that point. The two converging thicknesses of housing 5 meet to form shoulder 8. The purpose of this, as will be explained in more detail subsequently, is to prevent the lid from being inserted too far into the vessel housing.

In operation, lid 10 is implemented with vessel housing 5 in the following way. Flange 12 is rotated by handle member 14 to draw fingers 32 into their retracted positions as is shown in FIG. 3. In their retracted position, fingers 32 extend slightly beyond the circumference or edge of plate 18. Lid 10 is then lowered into the vessel housing 5 until finger 82 contact shoulder 8 of the receptacle to halt the lid's further downward progression. At this point, a seal is effected between the lid and vessel housing well 7 by virtue of O-ring 54. In this position, if there is any buildup of pressure within vessel housing 5, it will be vented out through plate vent shaft 48 since O-ring 44 carried by lid flange 12 is not in its sealing position over the vent shaft.

The user then rotates flange 12 by turning handle 14 to cause fingers 32 to pivot about pintle pins 34 and simultaneously shift outwardly on alignment bolts 50. Continued rotation of flange 12 will cause finger shoulders 42 to pass through openings 52 of housing 5. Such rotation is halted with fingers 32 in their full extended positions by the fingers abutting walls 81 of flange channels 80, as is shown in FIG. 2. In this closed position of lid 10, finger shoulders 42 extend through housing sidewall 6 and flange O-ring 46 is concentrically located about vent shaft 48 in sealing contact with plate 18 as can be seen in FIGS. 2 and 4. This concentric alignment of vent shaft 48 and O-ring 46 produces an air-tight seal to prevent pressure from escaping vessel housing 5 through shaft 48 during pressurization.

When lid 10 is in its fully closed position as shown in FIG. 1, the vessel may be pressurized. Such pressurization cause lid 10 to begin to rise until fingers 32 contact the upper edges of housing wall openings 52 as shown in FIG. 4. For added safety, finger shoulders 42 prevent withdrawal of fingers 82 into their retracted positions while the vessel is pressurized by overlying vessel housing wall 7. Upon depressurization, lid 10 will sink to its depressurized position and can then be removed by turning of handle 14 to retract fingers 32.

An important feature of this invention is the simultaneous operation of fingers 32 and the O-ring vent shaft combination previously disclosed. If lid 10 is not properly or fully closed or locked, O-ring 46 will not properly seated around plate vent shaft 48. If not sealed, vent shaft 48 will allow internal vessel pressure to escape and prevent vessel housing 5 from being pressurized. During opening, O-ring 46 breaks the seal over vent shaft 48 before finger shoulders 42 are drawn in past vessel housing wall 6. This allows any residual pressure to be harmlessly vented while maintaining the lid in a semi-closed position.

A second embodiment of the invention is depicted in FIGS. 6-8 and includes a flange 58 which is an integral part of handle 60. Horizontal handle member 62 is connected to handle 60 to form a grip for the user. Flange 58 is rotatably connected to cover plate 64 which forms a part of the lid by a threaded fastener 66 which traverses a central bore 68 in plate 64 and is turned into a threaded bore 70 of handle 60 as shown in FIG. 8. An annular boss 72 protrudes from the bottom side 74 of flange 58 about plate bore 68 and bears against plate 64 so as to cause a very small gap between flange 58 and the plate. This space allows for easier turning of handle 60.

Channels 76 are cut into the bottom side 74 of flange 58 to accommodate the shiftable movement of generally equal angularly located locking fingers 78. Pintle pins 80, shown in the figures as a molded or cast part of flange 58, but which may be fixed to the flange by any suitable means, are positioned so as to allow the fingers 78 to pivot about the pintle pins within channels 76. Fastener 66 has an O-ring 82 fitted within annular groove 84 to effect a seal between plate central bore 68 and the shank of the fastener.

Each locking finger 78 is generally formed in a rectangular bar shaped construction with a rounded pivoting end 90. A bore 92 is formed at the radial center of the rounded end 90 of each lock finger 78 for accepting pintle pin 80 An alignment slot 94 is formed in each lock finger 78 to accommodate shiftable movement of the finger between an extended position as shown in FIG. 8 and a retracted position as shown in FIG. 7. Each finger 78 includes at its distal end an inclined edge 110 and a detent part 96 which is formed between sides 97 and 99. Detent part 96, as will be explained, prevents the opening of lid 57 while the vessel is pressurized.

Alignment bolts 100 secured to plate 64 shiftably connect fingers 78 to the plate through slots 94 in such positions so as to place the fingers in alignment with openings 102 in the vessel housing 88. Plate 64 includes an annular groove 104 formed in the circumferential edge of the plate so as to accept O-ring 106 which effects a seal between housing wall 88 and plate 64.

Vessel housing 88 is stepped at its uppermost edge, such that the thickness of the housing wall in that area which contains openings 102 is somewhat less than the thickness of the housing below to that point and is supported therefrom by an annular tapered shoulder 108. Housing 88 is provided with one or more flow ports (not shown) to allow for pressuring flow into and out of the housing. A vent shaft 86 is formed in wall 98 of vessel housing 88 just below shoulder 108 to allow for the release of pressure from within the vessel when lid 57 is not in its fully closed position.

In operation, lid 57 is used with vessel housing 88 in the following way. Flange 58 is rotated by handle member 60 to draw fingers 78 into their retracted positions as is shown in FIG. 7. In their retracted position, fingers 78 extend slightly beyond the circumference or edge of plate 64. Lid 57 is then lowered into the vessel housing 88. At this point, O-ring 106 is positioned above vent shaft 86. Therefore, if there is any buildup of pressure within vessel housing 88 as the lid is lowered, it will be vented out through vent shaft 86 since O-ring 106 carried by the lid is not in its sealing position below the shaft.

When fingers 78 are aligned with housing opening 102, lid sealing ring 106 is located adjacent vent shaft 86 and the user then rotates flange 58 by turning handle 60 to cause fingers 78 to pivot about pintle pins 80 and simultaneously shift outwardly on alignment bolts 100. Continued rotation of flange 58 will cause inclined edges 110 of fingers 78 to cam against the upper edge of opening 102 to urge lid 57 downward. Such rotation is halted when the fingers 78 are in their full extended positions by the fingers abutting walls 77 of flange channels 76. In this closed position of lid 57, sides 97 of fingers 78 extend through housing sidewall 98 and lid O-ring 106 is located below housing vent shaft 86 in sealing contact with vessel housing 88 as can be seen in FIG. 8. This relative positioning of vent shaft 86 and O-ring 106 produces an air-tight seal to prevent pressure from escaping vessel housing 88 through shaft 86 during pressurization.

When lid 57 is in its fully closed position as shown in FIG. 8, the vessel may be pressurized. Such pressurization causes lid 57 to begin to rise until finger detent parts 96 contact the upper edges of housing wall openings 102 as shown in FIG. 8. For added safety, detent parts 96 due to their sides 97 straddling housing openings 102 prevents withdrawal of fingers 78 into their retracted positions while the vessel is pressurized. Upon depressurization, lid 57 to clear detent parts 96 can be removed by pressing down on lid 57 and turning of handle 60 to retract fingers 78. As fingers 78 are retracted residual pressure may urge lid 57 upwardly which causes inclined edges 110 to abut the upper edge of openings 102. Continued retraction of fingers 78 allows the gradual rise of lid 57 due to the sliding contact between edges 110 and openings 102. Upon lid 57 rising a sufficient amount, O-ring 106 will be positioned above vent shaft 86 to allow the residual pressure to escape before fingers 78 are completely retracted out of engagement with vessel housing 88.

As with the first embodiment, an important feature of the second embodiment of this invention is the simultaneous operation of fingers 78. If lid 57 is not properly or fully closed and locked, lid O-ring 106 will not be properly seated below vent shaft 86. If not sealed, vent shaft 86 will allow internal vessel pressure to escape and prevent vessel housing 88 from being pressurized. During opening, O-ring 102 breaks the seal o vent shaft 86 before fingers 78 are drawn in past the vessel housing wall 98. This allows any residual pressure to be harmlessly vented while maintaining the lid in a still secured position.

A modification of the locking fingers of the embodiment of FIGS. 6-8 is depicted in FIGS. 9 and 10. Except for the locking fingers and their accommodating openings in the vessel housing, the components of the vessel and their function and operation are the same.

Each locking finger 78' includes a detent part 116 which is formed between sides 112 and 113. Side 112 is inclined and has serrations 114. Openings 102' formed in vessel housing 88 include at its upper edge converging inclined edge parts 118 and 122. Edge part 122 includes serrations 124.

This modification operates like the previously described lids in that handle 60 rotates flange 58 to extend fingers 78' so that the distal ends protrude through openings 102'. As fingers 78' are shifted outwardly, its side 112 contacts inclined edge part 122 of housing opening 102' to urge lid 57 downward.

Upon pressurization as described above with regard to the construction of FIGS. 6-8, with fingers 78' in the closed position of FIGS. 9 and 10, serrations 124 and 114 mutually engage to prevent the withdrawal of fingers 78' while the vessel is pressurized. Serrations 124 and 114 also prevent accidental or unintended withdrawal of fingers 78' if the fingers were not placed in their full extended position during turning of handle 60.

It is to be understood that the invention is not to be limited by the above description but may be modified within the scope of the appended claims.

What I claim is:

1. A pressure vessel having a housing with an opening and a lid, said lid spanning the opening of said housing, locking means associated with said lid shiftable between a closed position for securing said lid to said housing, and an open position for releasing said lid from said housing, the improvement comprising safety means for preventing pressurization of said housing associated with said locking means wherein said safety means is inactivated to allow pressurization of the housing as said lid is locked to said housing, said safety means including a vent opening in one of said lid and housing and sealing means shiftable between a housing sealed and unsealed relationship with respect to said vent opening as said lock means is shifted respectively between said closing and open positions, said locking means including an actuator part attached to said lid, a plurality of extendable and retractable fingers carried by said actuator part, and a plurality of openings in said housing, means connecting said fingers to said actuator part for extended and retracted movement of the fingers upon shiftable movement of the locking means, said fingers extending through said housing openings when said locking means is shifted into its closed position.

2. The pressure vessel of claim 1 wherein said vent opening is through said lid, said actuator part overlies said vent opening and includes a component constituting said sealing means, said actuator part component being positionable over said vent opening in sealing contact with said lid about the vent opening when said locking means is in its closed position.

3. The pressure vessel of claim 2 wherein said actuator part component is a ring seal means for encircling said vent opening when said locking means is in its closed position.

4. The pressure vessel of claim 1 wherein said vent opening is through said housing, said lid having a peripheral edge carrying said sealing means and being shiftable relative to said housing into a first position as said locking means is shifted into its closed position and a second position as the locking means is shifted into its open position, said sealing means located between said housing opening and one side of said vent opening when the sealing means is in its second position, said sealing means located at the opposite side of said vent opening when the sealing means is in its first position.

5. The pressure vessel of claim 4 wherein said fingers include camming means engageable with said housing for urging said lid between its said first and second position upon said locking means being shifted between its closed and open positions.

6. The pressure vessel of claim 4 wherein said fingers include detent means located inwardly from said camming means to releasably anchor said lid to said housing when said locking means is shifted into its closed position and said housing is pressurized.

7. The pressure vessel of claim 4 wherein said housing openings include angled upper walls, said fingers include camming means engageable with said opening upper walls for urging said lid between its first and second positions upon said locking means being shifted between its closed and open positions.

8. The pressure vessel of claim 7 wherein said opening angled upper walls and said camming means include mutually engaging complimentary protrusions for maintaining said lid in its second position upon pressurization of said housing.

* * * * *